Figure 1A:
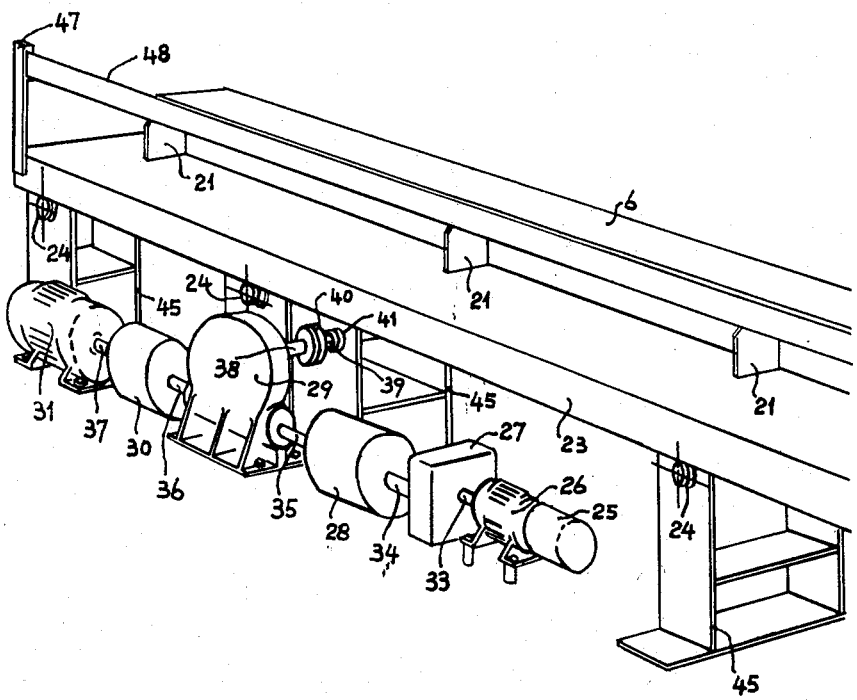

June 18, 1963   C. AUSENDA ETAL   3,094,028
FABRICATION SYSTEM

Filed Nov. 10, 1958   13 Sheets-Sheet 1

INVENTORS
CARLO AUSENDA, ROBERTO DESSALLES
D'EPINOIX, RENZO CASTELLINI & GIORDANO ORSOLATO
BY
Hooper, Leonard & Buell
THEIR ATTORNEYS

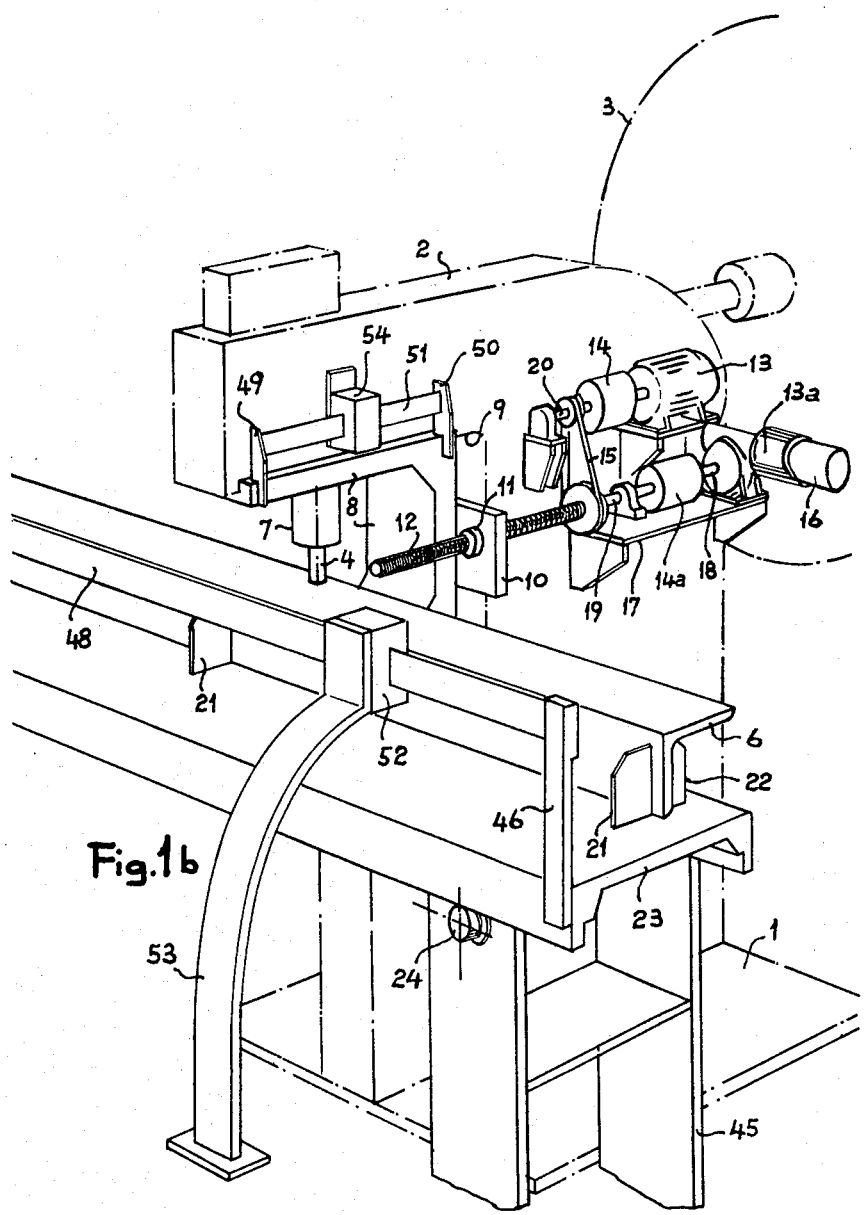

June 18, 1963 C. AUSENDA ETAL 3,094,028
FABRICATION SYSTEM
Filed Nov. 10, 1958 13 Sheets-Sheet 7

INVENTORS
CARLO AUSENDA, ROBERTO DESSALLES
D'EPINOIX, RENZO CASTELLINI & GIORDANO ORSOLATO
BY
Hoopes, Leonard & Buell
THEIR ATTORNEYS

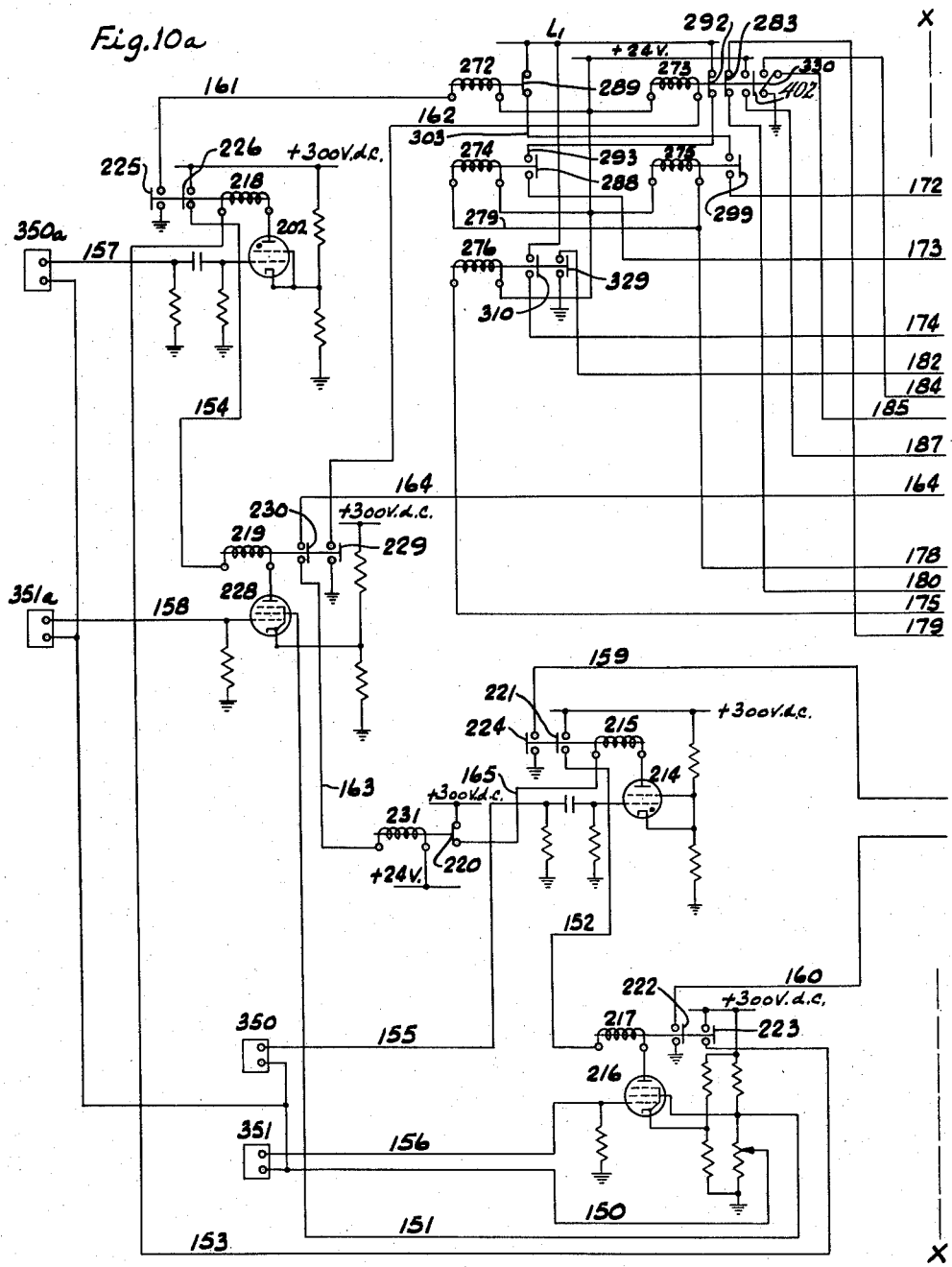

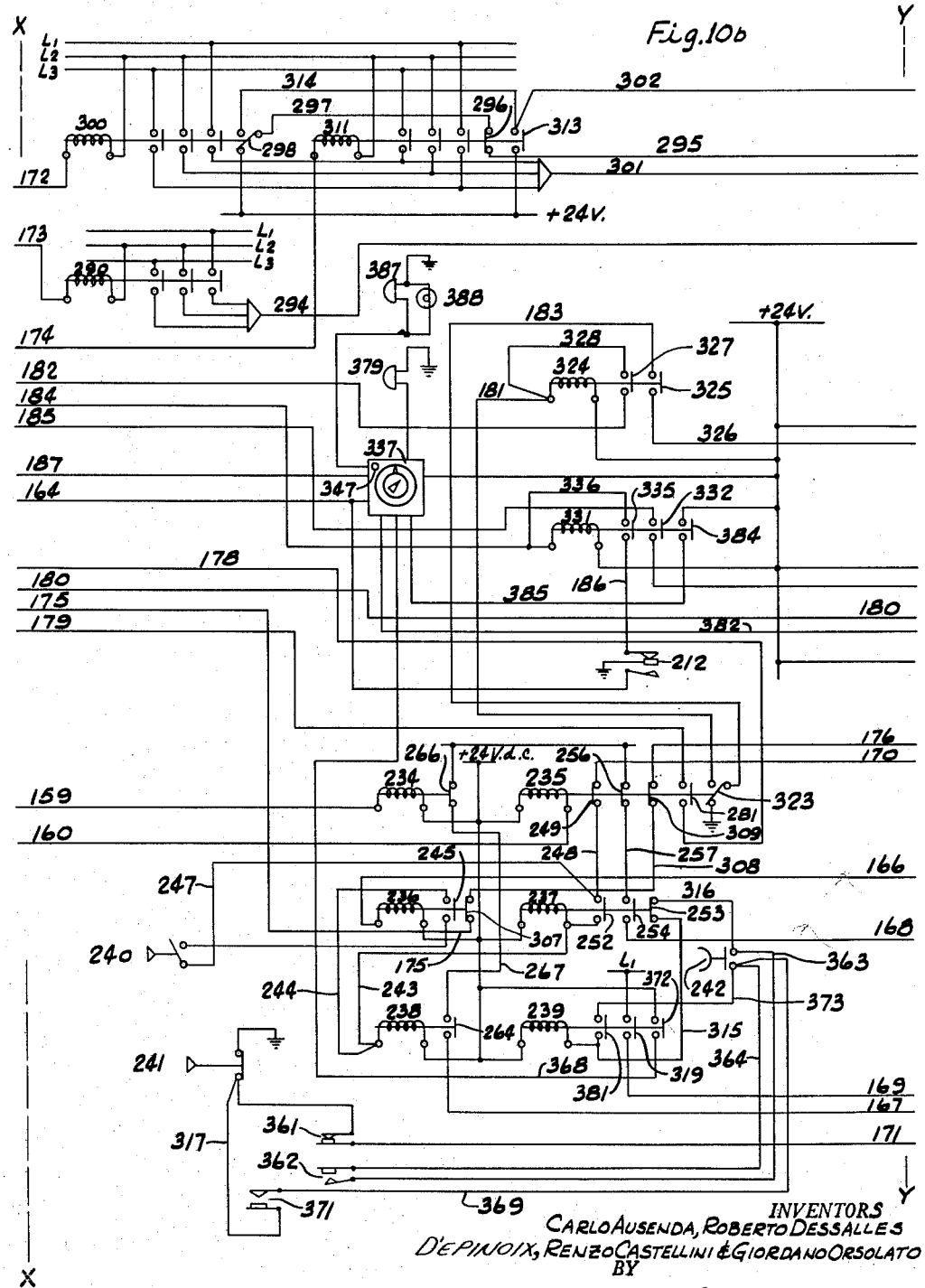

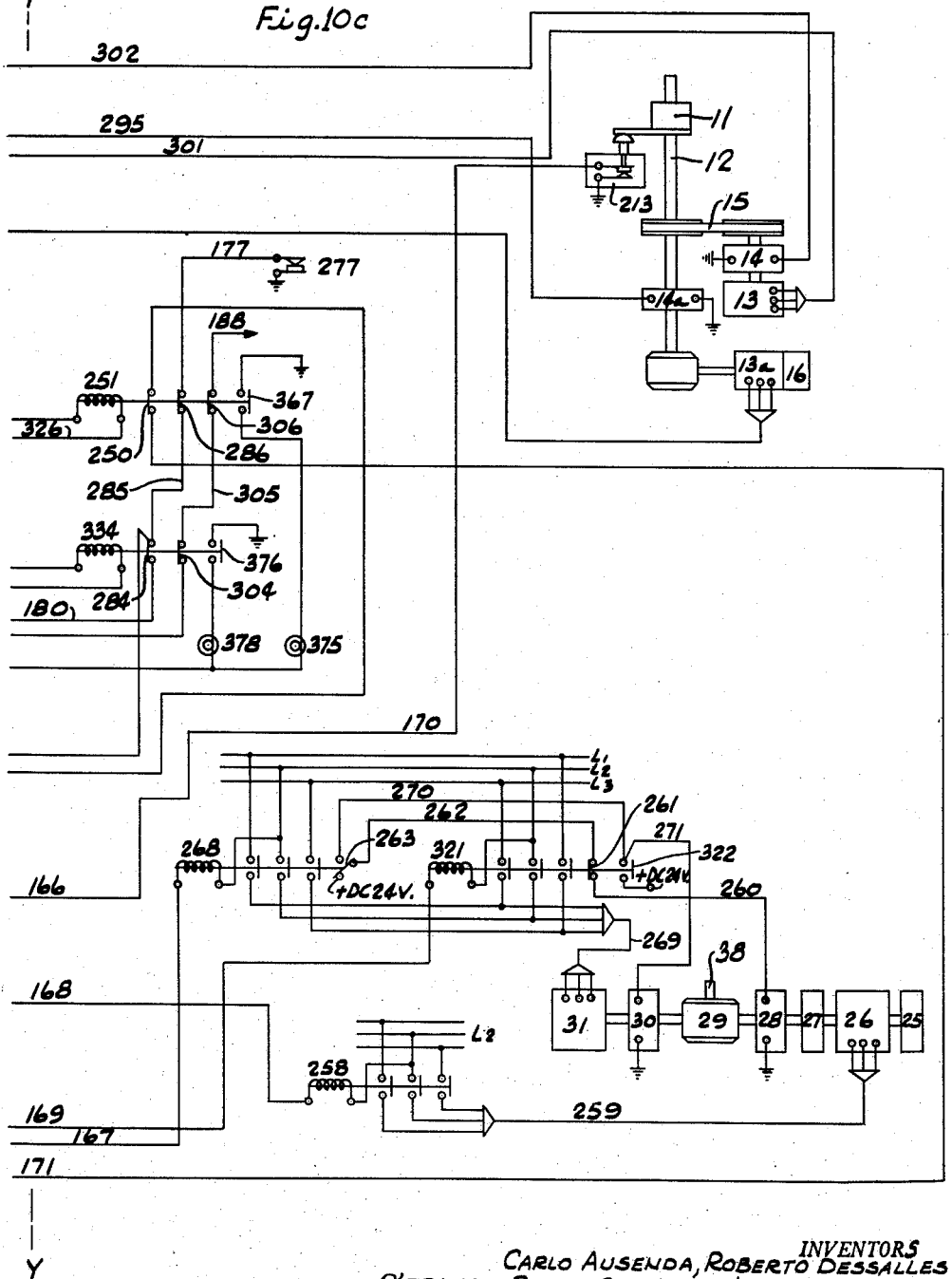

United States Patent Office 3,094,028
Patented June 18, 1963

3,094,028
FABRICATION SYSTEM
Carlo Ausenda, Roberto Dessalles d'Epinoix, Renzo Castellini, and Giordano Orsolato, all of Milan, Italy, assignors to Compagnia Italiana Forme Acciaio, Milan, Italy, a corporation of Italy
Filed Nov. 10, 1958, Ser. No. 772,738
11 Claims. (Cl. 83—71)

This invention relates to a fabrication system and apparatus in which a workpiece such as a strip, sheet or plate of steel, or other metal or material is moved relative to a tool along longitudinal and transverse coordinates under automatic control for the selected engagement of such workpiece by said tool at predetermined work locations. More particularly, this invention pertains to a system having a plurality of perforated tape and scanning head members for the respective control of longitudinal and transverse relative movements between a workpiece and a tool in an automatic manner whereby a single tool may be utilized in performing tooling operations required at different places on said workpiece.

Under this invention, a machine tool may be operated automatically in a longitudinal direction by means of one perforated master tape and scanning head and in a transverse direction by means of another perforated tape and scanning head, such tapes and scanning heads being interlocked electronically for automatic indexing of the tool at the respective work locations. One of such tapes, preferably the longer, is provided with the same distribution pattern as that on the fabrication layout for the workpiece with the lengthwise spacing of the perforations preferably being the same as that of the work locations. In like manner, the transverse tape preferably is perforated along lines corresponding to the lengthwise lines on the master tape through its perforations. The transverse tape perforations, like pinholes, may be punched therethrough in a lengthwise spacing preferably equal to the actual respective distances between the lengthwise lines on the workpiece. As a consequence, the preparation of suitable tapes is simple, relatively inexpensive and one which may be performed by relatively inexpert personnel. In addition, the lengthwise spatial correspondence of the perforations facilitates the setting up of such tapes for use. The present invention makes use also of a special drive system, with quick elimination of inertia forces, to produce the relative movements of workpiece and tool, using independent motors respectively for higher and lower speeds in which the rotating mass of the higher speed motor is instantly and automatically detached from the remainder of the drive system at the moment of transition from higher to lower speed.

Thus, by means of this invention, a single tool may be moved in three dimensional relation relative to a workpiece and utilized for an entire fabrication operation at different work locations. Further, such tape and scanning head mechanism disclosed herein may be operated in automatic fashion between the commencement of the fabrication operation and the completion thereof and such can be done without requiring computers or compensators because of the use of corresponding spacings and relatively rapidly with the tool moving from one work location to the next in accordance with the predetermined pattern. When desired, this invention inclusive of such drive mechanism may be applied to an existing punch press or movable drill head machine tool for the achievement of advantages of this invention.

Figure 2:
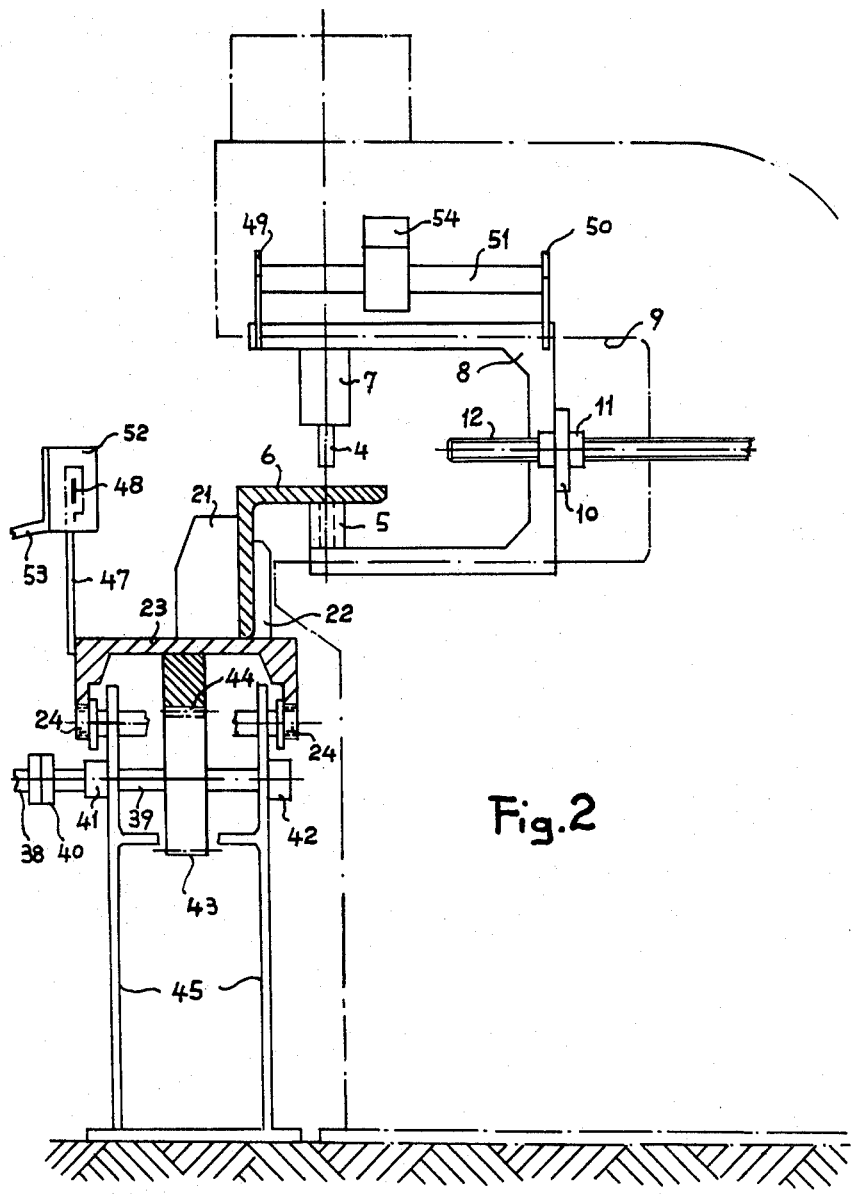
Figure 3:
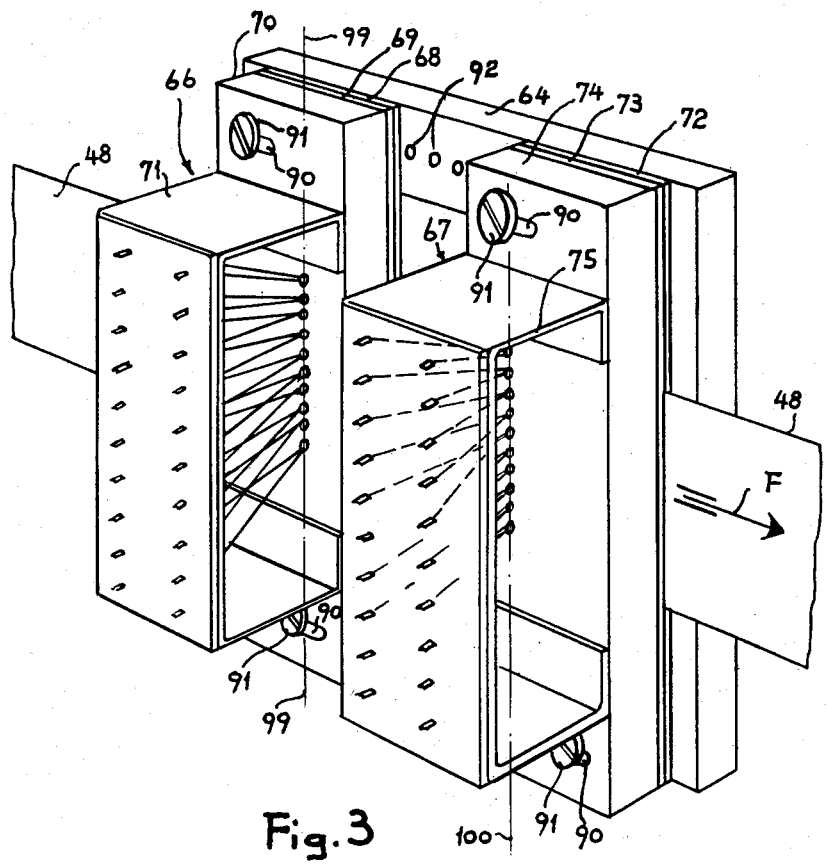
Figure 4:
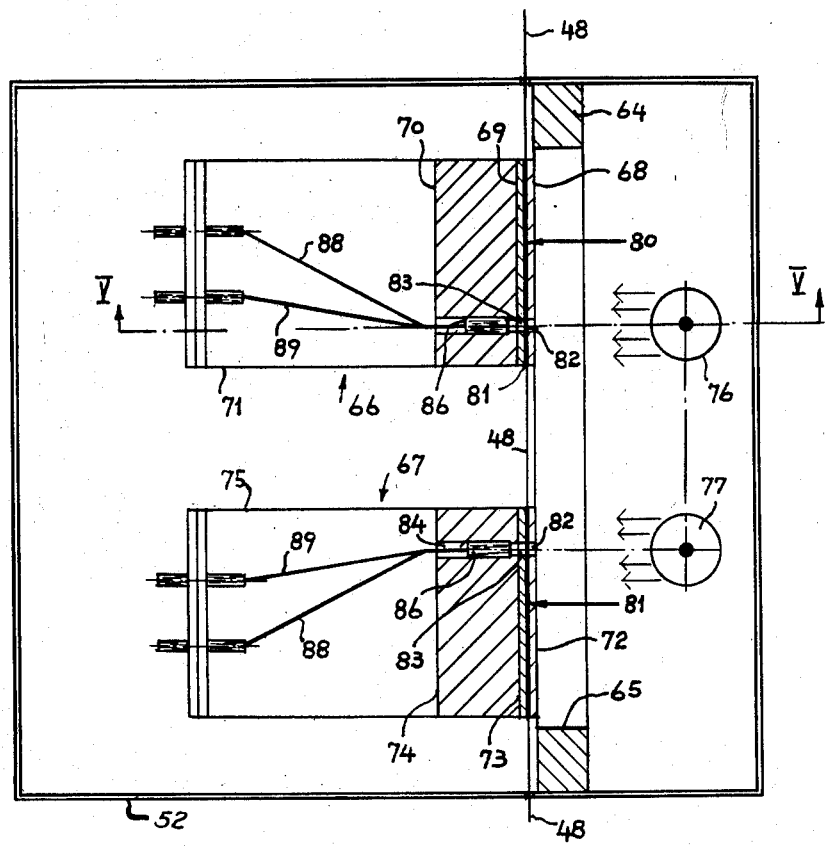
Figure 5:
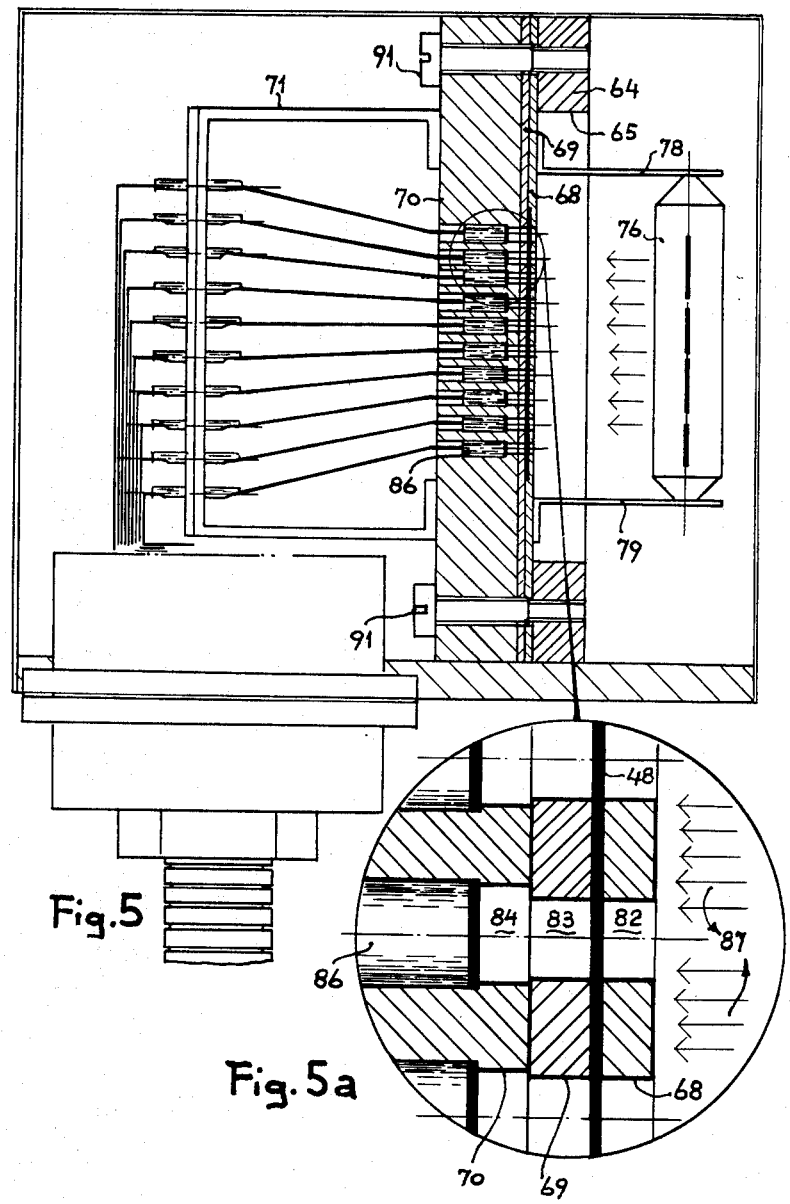
Figure 6:
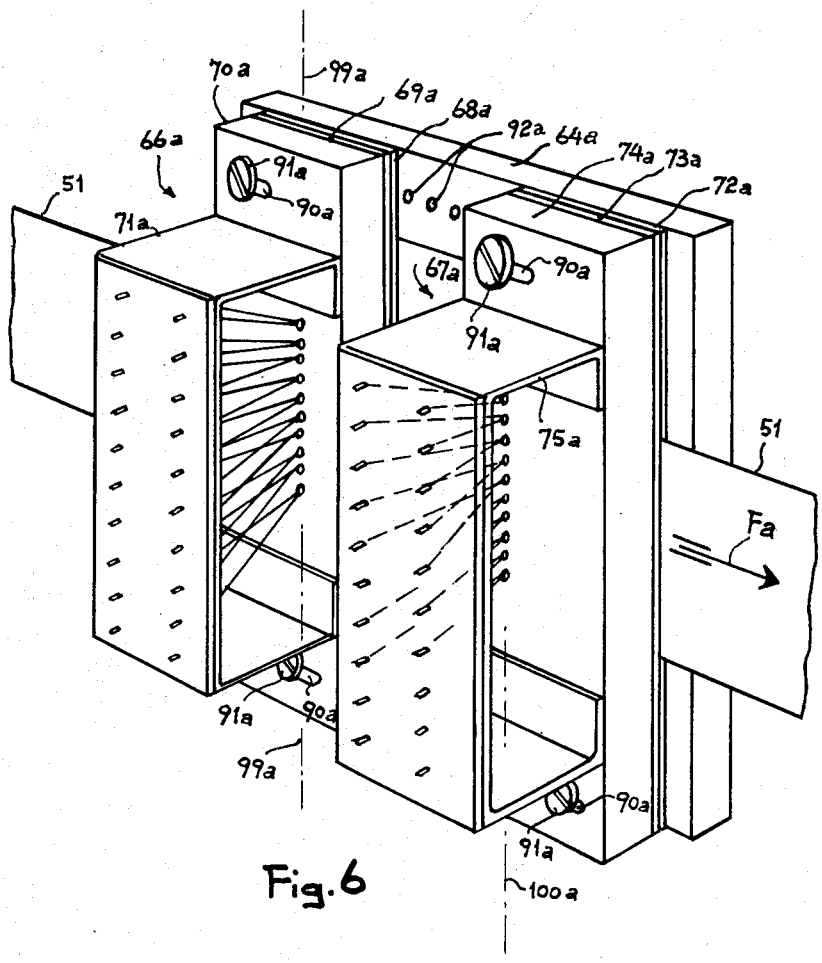
Figure 7:
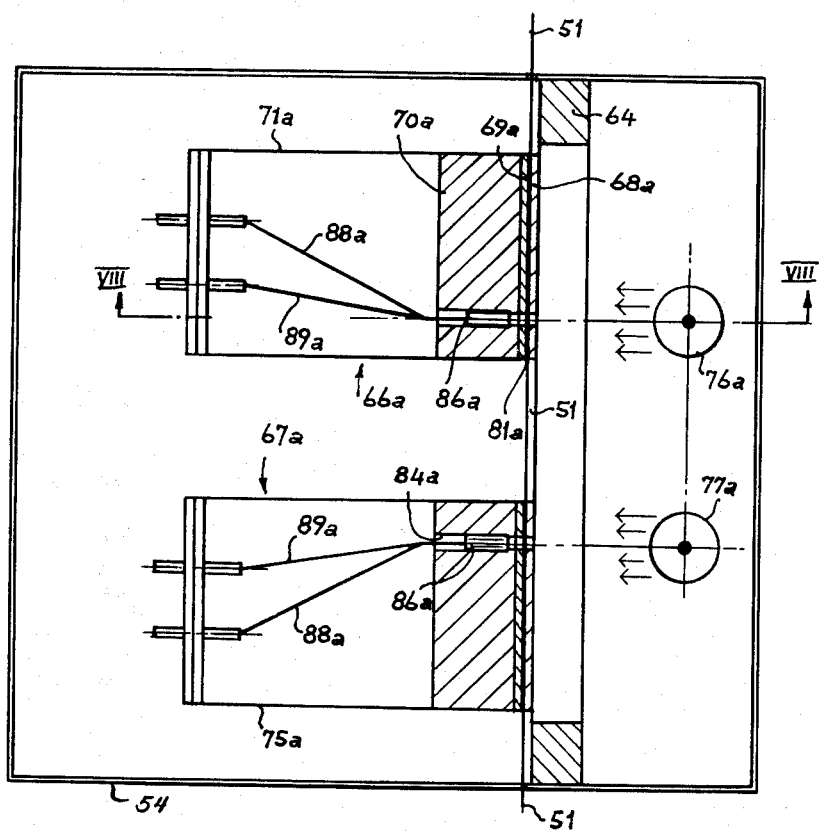
Figure 8:
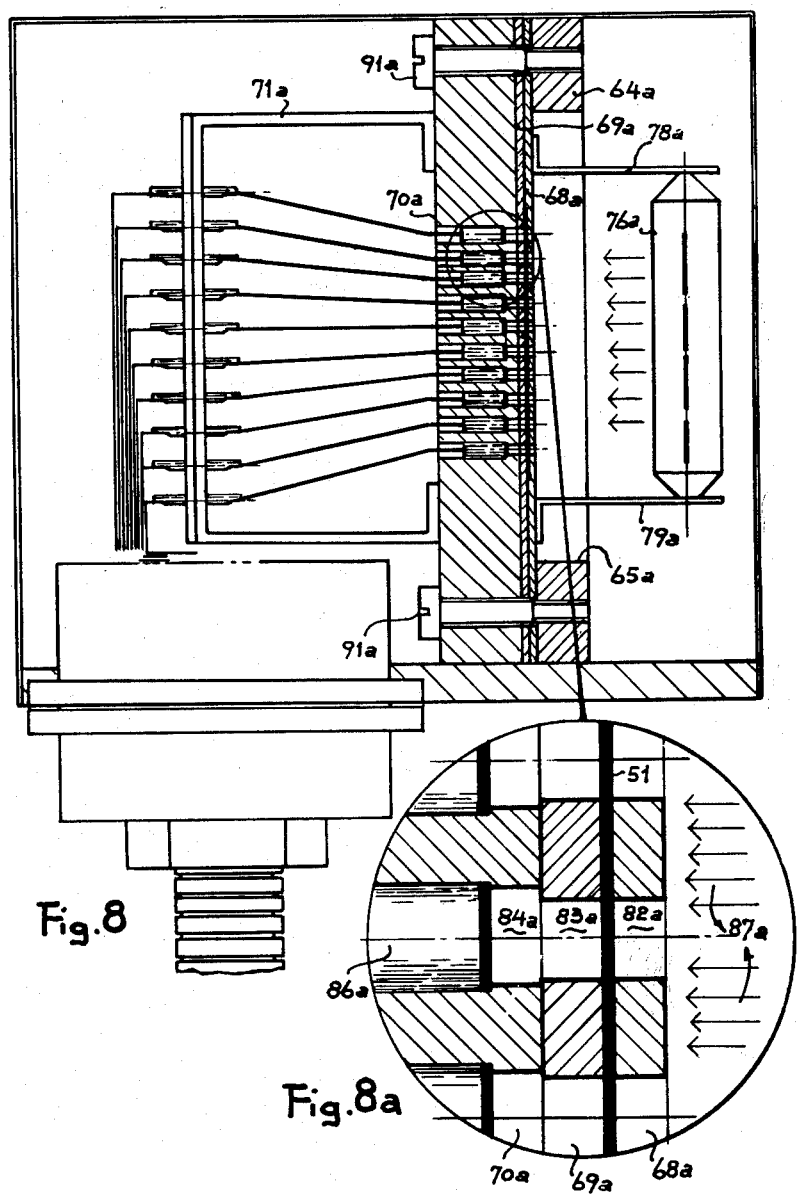
Figure 9:
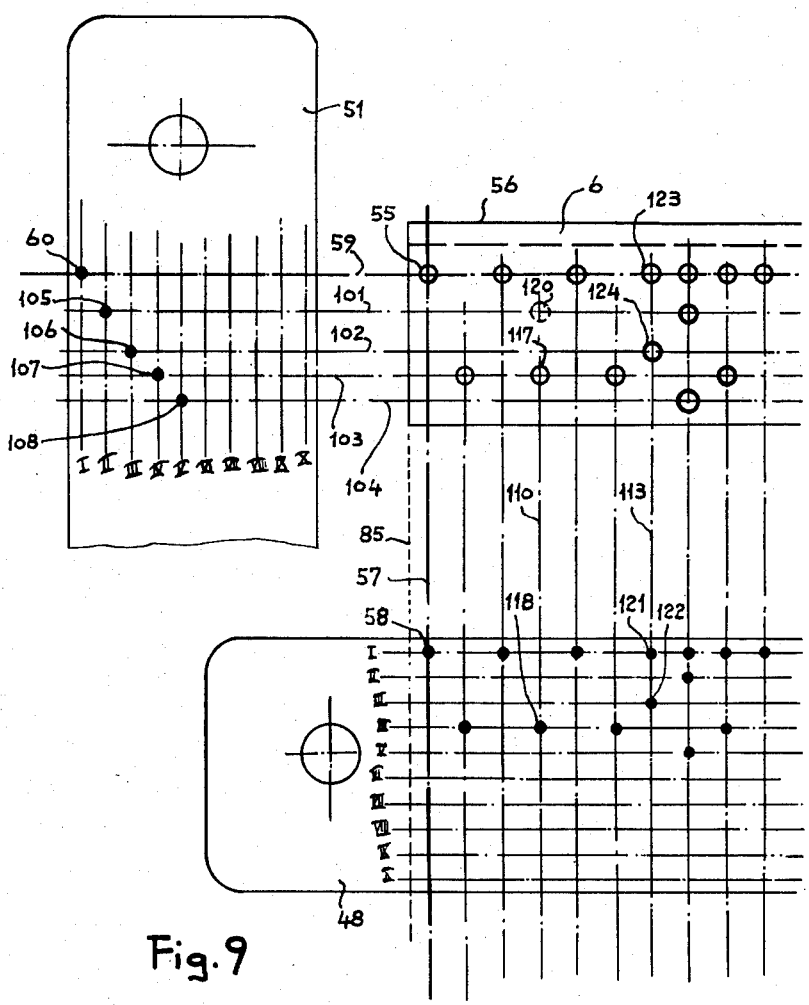

Other objects, features and advantages of this invention will be apparent from the following description and the accompanying drawings, which are illustrative only, in which FIGURES 1a and 1b together represent a machine in perspective showing one embodiment of this invention;
FIGURE 2 is a side view of the same machine, from the right side of FIGURE 1b, with some parts in section;
FIGURE 3 is a view in perspective, on a larger scale, of a scanning head for a longitudinal tape, seen from the side opposite to the light source;
FIGURE 4 is a horizontal section of the scanning head shown in FIGURE 3;
FIGURE 5 is a vertical section taken along line V—V in FIGURE 4;
FIGURE 5a is a detail view, on a larger scale, of the encircled portion of FIGURE 5;
FIGURES 6 to 8a are views respectively similar to FIGURES 3 to 5a, of a scanning head for a transverse tape;
FIGURE 9 is a schematic representation of a portion of the two tapes and of the workpiece;
FIGURES 10a, 10b and 10c set forth together a circuit diagram for an automatic operation of the embodiment of this invention illustrated in the foregoing figures.

Referring to FIGURES 1 to 9, there is shown therein a practical form of the invention applied to a punch press for the fabrication of workpieces, such as angles, of great length in respect to their transverse dimension, such fabrication comprising the punching of holes through a presented flange of the angle at the selected work locations thereon in accordance with the fabrication layout pattern. Such punch press, as seen in FIGURES 1a and 1b, is secured to the ground by means of base 1, and includes a body 2 to which a mechanism 3 is attached to transmit to punch 4 its vertical operating motion and the necessary power to punch holes in the workpieces subjected to such fabrication. A punch 4 (FIGURE 2) is opposed by a die 5, on which the flange of workpiece 6 to be fabricated is resting. When the mechanism 3 transmits the vertical punching motion to punch 4 through its holding neck 7, punch 4 descends through piece 6 supported by die 5. Holding neck 7 is further attached to a slidable part 8, which can move transversely to workpieces in the guides 9 of the machine. As a result, punch 4, over and above its vertical working motion, can also perform a transverse run equal to the motion of slidable part 8. Slide 8 is fixed to a support 10 bearing a nut 11 which engages a threaded arbor 12. Arbor 12 is mounted in such a way as to be immovable in respect to its longitudinal axis; when it is rotated, it moves transversely slidable part 8 and holding neck 7 attached to it.

The rotation of threaded arbor 12 is obtained by means of an electromechanical group, called "Transverse Driving Group," which is made up of a reversible electric motor 13, of greater power, an electromagnetic clutch 14, a transmission 15, a reversible motoreducer 13a of lower power, and an electromagnetic brake 16; the group is finally completed with an electromagnetic clutch 14a and with a baseplate 17, which is attached to the body 2 of the punching machine. This group is able to produce a rotary motion of threaded arbor 12 at two different speeds. Thus, the group is designed in such a way that by supplying electric current to motor 13 and to clutch 14, motor 13 drives shaft 20 at high speed through clutch 14 and shaft 19 (without influencing motoreducer 13a which is free from shaft 19 because clutch 14a is de-energized), and, as a result, drives threaded arbor 12 at high speed. On the other hand, if clutch 14 is de-energized, and current is fed to motor 13a, clutch 14a and brake 16, the output shaft of motoreducer 13a is attached to shaft 19 that is part of transmission 15, through clutch 14a (while shaft 19 is separated from motor 13 by such de-energization of clutch 14) there is low speed rotation of shaft 18, rotating threaded arbor 12 at low speed.

By de-energizing the motors and electrical members of the transverse driving group, with the exception of clutch 14a, no motion will be had, while at the same time electromagnetic brake 16 will exert a strong braking action on the rotary system to hold arbor 12 fast. In other words, it is possible to realize the following three dynamic conditions by means of the transverse driving group:

(a) A high speed rotating motion of threaded arbor 12 in the two opposite directions of rotation (b) A slow rotating motion of threaded arbor 12 in the two opposite directions (c) A quick stopping of rotating motion of threaded arbor 12 with brake holding thereof in stopped position.

Since the rotating motion of threaded arbor 12 produces a transverse translation movement of threaded screw 11 and of punch 4 attached to it through support 10, through sliding part 8 and through neck 7, the aforesaid situations will correspond:

In case (a), to a quick transverse movement of punch 4
In case (b), to a slow transverse movement of punch 4
In case (c), to a sudden stop of punch 4.

Workpiece 6, subject to fabrication (FIGURES 1a and 1b) is attached through clamp attachments 21—22 to a supporting table 23, which runs on rollers 24. The motion of table 23 is lengthwise with the piece and at right angles to the transverse motion of slidable part 8. The result is that punch 4 can punch holes in the workpiece in any position included in a rectangular field, of which the longer side is equal to the longitudinal displacement of table 23, and the shorter side is equal to the transverse run of slidable part 8.

The longitudinal driving group (FIGURE 1a) comprises an electromagnetic brake 25, a small electric motor 26, a speed reducer 27, an electromagnetic clutch 28, a second speed reducer 29, another electromagnetic clutch 30, a reversible large electric motor 31. The connection between these members is obtained by means of shafts 33, 34, 35, 36, 37. From speed reducer 29 a shaft 38 emerges, which is attached, by means of a flexible coupling 40, to a shaft 39 rotating in the two bearings 41, 42 (FIGURE 2). Shaft 39 is further secured to gear 43 which meshes with the teeth of rack 44, which in turn is attached to the table 23 that supports the workpiece. As a result, a rotating motion of arbor 39 produces an equal rotation of gear 43 which compels bar 44 to move longitudinally together with table 23. Table 23 moves on rollers 24, which with bearings 41—42 are secured to a supporting base 45 fixed to the ground.

The longitudinal driving group has the function of achieving the following three dynamic conditions, as was the case with the transverse driving group, which are:

(a) Fast rotation of arbor 39 in the two opposite directions of rotation (b) Slow rotation of arbor 39 in the two opposite directions (c) Quick stopping of the rotation of arbor 39 with brake holding thereof in stopped position.

Dynamic condition a (high speed rotation of arbor 39) is realized when electric current to clutch 28 is cut off, while motor 31 and clutch 30 are being fed with current; in this case, clutch 30, which is coupling together shaft 36 and shaft 37 (this latter being rotated at high speed by motor 31), transmits such quick rotation to shaft 36, and then, through reducer 29, to shafts 38 and 39.

Slow rotating motion of arbor 39 (dynamic condition b) is obtained when clutch 30 is de-energized and disengaged while brake 25, motor 26 and clutch 28 are energized. The slower rotation of motor 26 and shaft 33 is decreased by the action of reducer 27 to provide a slow rotary motion of shaft 34, which is transmitted by clutch 28 to arbor 35 and then by reducer 29, with a further reduction, to shafts 38 and 39.

Finally, condition c (stopping of rotary motion of arbor 39) is obtained when current is cut off from clutch 30, from motor 26 and from brake 25; while current continues to be fed into clutch 28, as in this case shaft 35 is coupled to shaft 34, which is being held securely by brake 25. This will result in the complete immobility of the whole system, composed by clutch 28, by shaft 35 and by the two shafts 38 and 39.

To table 23 are rigidly attached two supports 46—47, and in between them is stretched parallel to the longitudinal axis of the table, a tape 48 made of flexible, opaque and inextensible material. Similarly, to slidable part 8 are rigidly attached two supports 49—50, which hold stretched, parallel to arbor 12 and therefore crosswise to the former one, a second tape 51, also made of flexible, opaque and inextensible material. The two tapes are placed at right angles to each other.

Tape 48, which controls the relative longitudinal motion of workpiece versus tool, is attached to table 23 in such a way that longitudinal axis of the tape is parallel to the direction of displacement of table 23 and tape 48 moves accurately with the table in its movement.

Transversal tape 51, which controls the relative transverse movement of workpiece versus tool, is positioned exactly at a right angle to former tape 48, and is attached to slidable part 8 so that longitudinal axis of said tape 51 is parallel to the direction of displacement of slidable part 8 and moves with it in every motion.

Tape 48 travels through a scanning head 52 held in place by support 53 which is stationary in respect to the ground, and is used to scan longitudinal tape 48. Similarly, tape 51 travels through a scanning head 54, which is permanently attached to body 2 of the machine, and serves to scan transversal tape 51. Both tapes are provided, as will be explained later, with small perforations or pinholes, established in predetermined points, and corresponding to working positions on the workpiece.

As previously said, the two scanning heads are alike, therefore only scanning head 52 of tape 48 is going to be described in detail, as the same description will apply also to scanning head 54 of tape 51, on which the same reference numbers have been used, but provided with a distinguishing suffix "a." Scanning head 52 (FIGURES 3 to 5a) is made up of a supporting frame 64, in which an opening 65 is provided, and two scanning boxes 66 and 67 attached to said supporting frame. Box 66 is provided with a diaphragm 68, a lower opposite diaphragm 69, and a base 70 made of opaque insulating material, with support 71 to hold the electric wires to the terminals. In the same way box 67 is made up with a diaphragm 72, an opposite lower diaphragm 73, a base 74 of opaque insulating material, and a support 75 for the electric wires to the terminals. To each one of the two boxes 66 and 67 there is attached a light source 76 and 77, respectively, each by means of end supports 78 and 79.

In between the two diaphragms 68 and 69, and also between the two diaphragms 72 and 73, a small recess 80—81 is provided, and in these two opposite recess portions tape 48 slides. The above diaphragms are provided each with a series of ten holes 82 (in case of diaphragms 68 and 72) and 83 (in case of diaphragms 69 and 73) respectively; these rows of ten holes each are placed end to end, two by two along station lines 99 and 100, both of which are perpendicular to the longitudinal axis of tape 48. Each of the holes 82 and 83 in a set is coaxial in alignment with their respective hole 84 in the column of ten holes in each of the bases 70 and 74 respectively.

In each of the holes 84 of bases 70 and 74 photodiodes 86 are inserted of a known type, which are able to transform light impulses originating from sources 76 and 77 and passing through the pinholes of tape 48 as they register with respective sets of holes 82 and 83, into electrical signals. From each one of said photodiodes start wires 88, 89 to convey said electric signals to a special electronic apparatus which controls the longitudinal driving group.

Light sources 76 and 77 are in the form of cylindrical lamps, with a straight filament, parallel to spaced center lines 99 and 100 in registry with the respective centers of elements 86 in the two columns, and of such a length as to be able to cover the rows of holes 82 of each said line-ups.

Keeping in mind the positive or forward direction of movement for a working stroke shown by arrow F (FIGURE 3) on tape 48 relative to scanning head 52, lines 99 and 100 respectively correspond to the points of transition from above-described dynamic condition $a$ to dynamic condition $b$; and, respectively, from condition $b$ to $c$; lines 99 and 100 are sometimes hereafter called "decelerating line" and "stopping line" respectively; these expressions being referred to the relative movement of the tape-scanning head members.

Furthermore, for the purpose of being able to adapt the scanning head to particular characteristics, both mechanical and kinematic, of different machine tools, it is advantageous to have the possibility of adjusting the distance, measured perpendicularly to said lines, between "decelerating line" 99 and "stopping line" 100. For such purpose, bases 70 and 74, and correspondingly diaphragms 68, 69 and 72, 73 are provided, at their extremities, with slotted holes 90, affording passage to screws 91, which are secured in threaded holes 92, which in turn are placed along the edges of supporting frame 64; the length of such slots 90 being enough to span additional adjacent holes 92, with the result that the positions of boxes 66 and 67 can be spatially adjusted in respect to each other lengthwise of the tape over a considerable distance in an uninterrupted manner.

Tapes 48 and 51 are shown in drawing (FIGURE 9) with ten tapelines, which are distinguished with Roman numerals from I to X; these lines are parallel to the longitudinal edges of the tapes and they represent a like number of longitudinal abscissa gauge lines on the workpiece. Along these tapelines on the tapes are placed the pinholes which pass through the scanning heads 52 and 54 and serve to cause the automatic relative positioning between tool 4 and workpiece 6 and then the energizing of said tool; such lines may be called "longitudinal lines of pinholes." The positioning of any typical work location hole 55 in the workpiece 6 can always be defined, in respect to workpiece 6, by two coordinates, measured the first, used as abscissa, parallel to edge 56 of workpiece 6; and a second, used as ordinate, in a perpendicular direction to edge 56. To every hole such as 55 to be made in a workpiece, there is a pinhole on the corresponding line of tape 48. There is also one pinhole on the corresponding line of tape 51 for all the pinholes in the corresponding longitudinal line of pinholes in tape 48. These two cooperating pinholes in the two tapes permit pinpointing on workpiece 6 of the position corresponding to the center of hole 55, starting from an origin of coordinates which can be chosen at will; such origin can be found, for example, in the point of intersection of the longitudinal edge 56 of workpiece 6 with the transverse edge 85 at right angles to the former.

In the drawing (FIGURE 9) in which it has been assumed that only five of the ten tapelines available are used, work location 55 on workpiece 6, being located on the first tapeline (and which on workpiece 6 is defined by gauge line 59 parallel to edge 56 of said workpiece and ordinate 57 parallel to edge 85), will be indexed, for example, by pinholes 58 and 60 of tapeline I, respectively of tape 48 and of tape 51; such pinholes 58 and 60 being respectively located in drawing (FIGURE 9) on line 57, which passes through the center of hole 55 and is perpendicular to gauge line 59, and on an extension of line 59.

Tape 48 will therefore be provided, for each of the tapelines I to X, with as many pinholes as there are holes on the corresponding gauge lines of workpiece 6; their progressive distances from the point of origin will correspond to the distances, measured on workpiece 6, along the axis of the respective abscissa lines; while on tape 51 there will be one pinhole for each tapeline I to X, corresponding to each longitudinal gauge line on workpiece 6, a distance apart lengthwise of tape 51 corresponding to the distance between such gauge lines respectively, when all ten are used.

It is evident from what was said above that once the work location pattern for tooling operations on the workpiece has been established, tapes 48 and 51 can be prepared independently, and from the machine tool which is to use them, and at any distance from it.

The machine in all its parts has been described. Its operations shall now be discussed: ordinarily tape 48, which slides between diaphragms 68 and 69, and 72 and 73 of scanning head 52, will prevent light beams, that have passed through holes 82, to also pass through holes 83—84 and to reach the sensitive surface of photodiodes 86; this will permit the starting of the longitudinal driving group, producing a high speed relative movement between workpiece 6 and tool 4 and at the same time between tape 48 and scanning head 52. However, as a pinhole of tape 48 reaches decelerating line 99 it will register with an aligned series of holes 82—83—84 so that at the exact moment in which pinhole on the tape will reach such position, light beams 87 coming from light source 76, not finding the previously mentioned obstacle of tape 48, will successively pass through those holes 82—83—84 and will strike the sensitive surface of a corresponding photodiode 86 (FIGURE 5a). Such a photodiode struck by the light impulse, will transform same into an electric signal, which, through wires 88 and 89 will be sent to the electronic controlling apparatus mentioned above. The controlling electronic apparatus will amplify and transform such an electric signal, by operation of the relays which control the electro-mechanical mechanism of the longitudinal driving group. Matters are arranged in such a way, that a light impulse on any one of the photodiodes belonging to box 66 of scannning head 52, causes deceleration from high speed to slow motion of shaft 39 (in the shortest time, and therefore in the shortest possible space) as a result of the disengagement from the longitudinal driving group, of high speed motor 31, due to de-energization of said motor and of clutch 30 at the same time that slow speed motor 26 with its connected system of reducers and of clutches is energized, to establish dynamic situation $b$ indicated above for arbor 39 (FIGURES 1a and 1).

Supposing now that at the start of the operation, through an electro-manual control, a dynamic situation such as case $a$ of shaft 39 (high speed rotation) had been produced and that therefore to table 23, holding the workpiece 6, a quick longitudinal motion had been imparted; the fact that a pinhole of tape 48 reaches decelerating line 99 on which are placed the ten photodiodes 86 (FIGURE 3) will quickly change the high speed rotation of shaft 39 to a slow rotating motion. Consequently the table 23 supporting workpiece 6 will cease its rapid longitudinal motion and will start a very slow motion.

Together with this slow motion of table 23 (holding workpiece 6) there is a corresponding slow sliding of tape 48 through scanning head 52; the pinhole on tape 48, which by the act of passing in front of decelerating line 99 has produced the quick change over from high speed movement to a slow rotating movement, going farther along in the slow motion of tape 48 through scanning head 52, will finally reach stopping line 100 made up by the ten photodiodes 86 in box 67, and the same pinhole will permit the passage of light beams originating from source 77 to strike the one photodiode 86, in the column of stopping line 100, which is located in corresponding position on the level of that same pinhole. Such photodiode will obviously be (of the ten located on stopping line 100) the one that corresponds to that particular line numbered I to X of tape 48, on which the pinhole in question is located. Such photodiode will transform the light impulse into an electric signal which will be properly amplified by the electronic apparatus and will operate one or more relays; this operation in turn will be the determining cause of situation c of shaft 39 (sudden stop of the rotation movement).

Things are arranged in such a way, that as soon as the longitudinal motion comes to an immediate stop, produced in the way above-described, the start of the relative transverse motion between tool 4 and piece 6 begins by movement in translation of slidable part 8. The movement of slidable part 8 causes a sliding of the transverse tape 51 in the scanning head 54, this movement being first quickly slowed down and then suddenly stopped precisely, at the moment a pinhole of tape 51 passes in front of a respective photodiode 86a in preset readiness condition in boxes 66a and 67a (FIGURE 6) contained in scanning head 54. Such deceleration and index stopping happens in an identical way as in the case of the above-described longitudinal motion, thus realizing the various dynamic situations of the transverse motion control group, that is: quick rotation of threaded shaft 12, slow rotation and then a sudden stop of the rotary motion of threaded shaft 12 with, consequently, a sudden stop of the translation movement of slidable part 8.

To the control for the final precise stopping of the longitudinal motion of table 23 is connected the control signal for the starting of the transverse movement of slidable part 8; and the control signal that stops the working stroke motion of translation of slidable part 8 automatically by means of the aforesaid electronic apparatus is connected to the control signal for causing punch 4 to make the hole at the then indexed work location in workpiece 6.

Once such hole in workpiece 6 has been produced, the action of the above-mentioned electronic apparatus causes in accordance with the next pinhole on tape 48 either a further displacement of slidable part 8 for its positioning to another working position (that is for the scanning of a further ordinate of the same abscissa); or else, the return of slidable part 8 to the zero transverse position and the following starting of the longitudinal relative motion, to search for, and position itself at the next working position corresponding to next abscissa in a longitudinal working stroke direction. Thus, there is strict coordination not only between the geometrical positions of the pinholes of tape 48 and of tape 51, in the above-mentioned way, but also precise coordination between the controlling action caused by them so that, for example, a pinhole of tape 48 is assigned the task of not only causing the stopping of the longitudinal motion in correspondence to the abscissa distance of such pinhole, but also of signaling to the electronic control which one of the transverse tool distance positions should be associated with said longitudinal point. Therefore, the scanning head 52 is in a position to read such length and cross distance indications of its tape and send to the electronic control for the transverse driving group electric signals that are different according to the differences in the position of the pinholes on tape 48 to obtain corresponding operating signals for slide 8 and tool 4.

Hereafter are described in detail, as an example only, some particular positioning operations with reference to the diagrammatic representation shown in FIGURE 9.

If hole 117 of workpiece 6 is examined, it is clear that the position of such hole 117 is defined, in respect to gauge line abscissa, by pinhole 118 of tape 48; and in respect to the ordinate, by pinhole 107 of transversal tape 51; pinhole 118, in view of what has been observed above, will by its position on longitudinal tape 48 establish:

(a) The abscissa of hole 117 on workpiece 6,
(b) The choice of the correspondingly proper ordinate, amongst the five cross tapelines borne by transversal tape 51 (cross lines 59, 101, 102, 103 and 104).

Definition of that abscissa is obtained by putting hole 118 on the transverse line 110 of the tape 48 which crosses the tapelines I to X. The ordinate of hole 117 on workpiece 6 is, on the other hand, defined by pinhole 107 of transversal tape 51, which is to be found on tapeline IV just as work location 117 is placed on the fourth gauge line, starting from edge 56 of workpiece 6 pursuant to the layout pattern for that flange of that workpiece. Further, pinhole 118 of tape 48 will indicate, with its own position, that the transverse stop must come as a result of signals produced by pinhole 107 and not by any other and pinhole 118 is thus placed at the intersection of transversal line 110 and tapeline IV on tape 48.

Since each tapeline I to X of tape 48 is on a different level, each passes in front of only one photodiode 86 of the decelerating line 99, and of only one photodiode 86 of the stopping line 100 in scanning head 52 so it is clear that each electric signal emerging from scanning head 52 for a particular pinhole is from a photodiode corresponding to the same tapeline in tape 48 in which is to be found the pinhole that produced it; therefore, in the case of workpiece hole 117, which is located on the fourth tapeline 103, the signal originates from the fourth photodiode starting, for example, from top of each box in scanning head 52.

The electronic control is further arranged in such a way that the photodiodes 86a of scanning head 54 are not normally activated, but electrical correspondence is established between a photodiode 86 which scans a tapeline in tape 48 and the two photodiodes 86a which read the tapeline of the same number in tape 51. Thus, when a photodiode of stopping line 100 of the scanning head 52 is struck by a light impulse (which has passed through a pinhole placed on the tapeline of tape 48 passing said photodiode), such photodiode transmits an electric signal to the electronic control, which, in turn, activates only the pair of photodiodes 86a respectively on decelerating and stopping lines 99a and 100a of scanning head 54, which correspond to that photodiode of scanning head 52. In other words, the light signal that strikes any one photodiode pertaining to line 100 of scanning head 52, over and above determining the immediate stop of the longitudinal motion and the start of the transverse movement, causes also the activation, by putting them into readiness, of the pair of photodiodes corresponding thereto in scanning head 54. As a result, the transverse motion is first quickly slowed down and then stopped, e.g., when pinhole 107 passes in front of lines 99a and later 100a of scanning head 54, this as a result of the light rays passing through said pinhole 107; the other light rays, for example, that pass through pinholes 60, 105, 106, 108, would also intersect their corresponding photodiodes without creating electrical signals.

It is clear, for example, that by placing pinhole 118 on tapeline II of tape 48, instead of on tapeline IV, there would result a stop of the relative longitudinal motion between tool and workpiece, identical to the one resulting in the case of pinhole 118 being in the position shown in FIGURE 9, but in such a case the pair of photodiodes pertaining to transversal scanning head 54, which scan tapeline II of tape 51 would be activated in lieu of the pair that scans tapeline IV and the transverse motion in this case would therefore be stopped in the position established by pinhole 105 of tape 51, which is found on its tapeline II. Therefore, the tooling position of tool 4 relative to workpiece 6 would be determined by the abscissa established by pinhole 118 (supposedly on gauge line II) and by ordinate established by pinhole 105, which is found on tapeline II of tape 51; the result would be the composite work location positioning indicated by the dotted hole referred to as 120 on workpiece 6 (FIGURE 9).

If the two pinholes 121 and 122 of tape 48 are considered, it is possible to understand what happens in case more than a pair of photodiodes 86 is activated at the same time. During the sliding of tape 48 in recesses 80 and 81, each one of pinholes 121 and 122 acts in a way perfectly similar to what has been said before, that through each one of pinholes 121 and 122 light beams strike simultaneously the photodiodes 86 in scanning head 52 which react to pinholes on tapelines I and III of tape 48. The photodiodes 86 for those tapelines send to the electronic control at the same time, electric impulses which, properly transformed, will determine first the abrupt slowing down and then the sudden stop of the relative longitudinal motion of tool 4 versus workpiece 6, the same as happens in the case of a single pinhole having a particular abscissa. Moreover, each one of pinholes 121 and 122 determines the electrical activation of scanning head 54, so that the pair of photodiodes 86a corresponding to each of tapelines I and III of tape 51 will be in position to register light rays, the result being that in the transverse motion there will be two stops, one in correspondence of the transverse position indicated on tape 51 by pinhole 60, and the other by pinhole 106, placed respectively on tapelines I and III to position tool 4 over and execute the respective holes 123 and 124 in workpiece 6 in turn.

A machine of the kind illustrated is particularly well adapted for certain operations such as are found in steel fabrication, in airframe construction, in shipyards, and so on. In such operations, the workpieces may be pieces which are relatively long, as in the case of some structural shapes used in steel fabrication, or both long and wide as in the case of heavy plates for shipyard fabrication. Generally, the work locations are relatively few considering the sizes of the workpieces and may be variably spaced one from the other. A corner leg angle for a big steel structure (such as a heavy TV tower) can, for example, be readily fabricated by this invention even though it may be a single piece, possible 36 to 40 feet long and 6 to 8 inches wide, on which, in groups of work locations of very different patterns from each other, and variably spaced apart lengthwise and crosswise, 70 to 80 or more drilling or punching operations, all of the same diameter hole, may be desired. Under this invention, such work is performable by means of the same drilling tool or punch and quick production obtained especially when the workpiece is moved lengthwise in relation to the punching press at a very considerable speed, possibly of the order of 1 to 2 feet per second, or more, without sacrifice of the ability to stop the workpiece frequently in a minimum distance and at precisely indexed work location positions. In view of the dimensions, masses and forces involved in such operations, it is impractical to use conventional apparatus therefor.

A description of a preferred circuit and action follows starting with the assumption that the piece to be worked is clamped in place, both longitudinal and transversal tapes are in place and the longitudinal and transverse drives are in their zero position.

Start pushbutton 240 is pressed completing energizing circuit for relay 237 (having one side connected to +24 volt bus) through contact 245 of relay 236 (energized due to operation of zero transverse limit switch 213), through normally closed contact 249 of de-energized relay 235, through normally closed contact 250 of de-energized relay 251, through closed contact 361 of zero longitudinal switch and through normally closed contacts of stop button 241 to ground. Contact 252 of relay 237 is a holding contact and keeps the relay energized even should the switch 240 be opened. Contact 254 of relay 237 completes the circuit between L1, normally closed contact 256 of de-energized relay 235, and the three phase slow longitudinal motor contactor 258 (having one side connected to L2). The slow longitudinal motor 26 operates and drives shaft because electromagnetic clutch 28 is energized through normally closed contacts 263 and 261 of respectively de-energized fast longitudinal forward motor contactor 268 and longitudinal reverse motor contactor 321. After a time delay relay 238 operates (having been energized during the above) closing contact 264 and energizing the fast longitudinal forward motor contactor 268 through the normally closed contact 266 of relay 234. The high speed longitudinal three phase motor 31 operates in the forward direction. Electromagnetic clutch 30 is also energized through the closing of a contact 263 of motor contactor 268 while clutch 28 is de-energized by the opening of the same contact 263 on contactor 268.

The table 23, workpiece 6 and longitudinal tape 48 are now moving at high, forward longitudinal speed, until a pinhole 58 on tape 48 reaches center line 99. A light impulse strikes photo diode 350, changes its electrical resistance and produces a pulse of current upon the grid of thyratron 214, causing it to fire since its plate circuit is completed through the coil of relay 215 and through the normally closed contact 220 of relay 231 to the positive 300 volt bus. Firing of thyratron 214 energizes relay 215 closing its contacts 221 and 224. Contact 221 applies positive 300 volts to the plate of vacuum tube 216 through the coil of relay 217, readying the precision longitudinal stopping circuit. Contact 224 of relay 215 completes the energizing circuit for relay 234, producing the opening of contact 266 thereof. Fast forward longitudinal motor contactor 268 opens and stops high speed motor 31 by removing its three phase supply voltage. Contact 263 of contactor 268 de-energizes clutch 30 and energizes slow speed clutch 28 through the normally closed contact 261 of contactor 321. Slow longitudinal motion of table, workpiece and tape are maintained by motor 26, until pinhole 58 on tape 48 reaches center line 100. A light impulse strikes photodiode 351, changes its electrical resistance and produces a pulse of current upon the grid of vacuum tube 216. Relay 217 becomes energized closing its normally open contacts 222 and 223. Contact 223 places the transverse thyratron 202 in readiness for the transverse stopping action. Contact 222 of relay 217 energizes coil of relay 235 opening contact 249 thereof. Relay 237 de-energizes as does slow speed longitudinal motor contractor 258. Slow speed motor 26 is de-energized and stops at once due to its brake 25. The table, workpiece and tape are now stopped in a precise longitudinal position.

Closing of contact 281 of relay 235 completes relay 274 operating circuit through normally closed contact 283 of de-energized relay 273, through normally closed contact 284 of de-energized relay 334, through normally closed contact 286 of de-energized relay 251, through contacts of upper limit switch 277 closed when punch or drill is in its return rest position. Operation of relay 274 connects high speed transverse motor contactor 290 through normally closed contact 292 of de-energized relay 273, between lines L1 and L2 of the three phase power supply. Low speed transverse motor 13a drives the tools and tape 51 at low transverse speed, since clutch 14a is energized through normally closed contact 296 of de-energized contactor 311 and through normally closed contact 298 of de-energized contactor 300 to the positive 24 volt bus. After a short time, delay relay 275 operates since it has the same operating circuit as relay 274. This energizes forward high speed transverse motor contactor 300 through the normally closed contacts 289 of de-energized relay 272. Three phase supply voltage is applied to high speed transverse motor 13. Clutch 14 is also energized thus transmitting high speed transverse motion. Clutch 14a is de-energized removing the low speed transverse drive.

When a pinhole 60 on transverse tape 51 reaches center line 99a, a light impulse strikes photodiode 350a, reducing its electrical resistance, and producing a pulse of current upon the grid of thyratron 202. Since the plate circuit of thyratron 202 is completed through coil of relay 218 through the closed contact 223 of energized relay 217 to the +300 v. D.C. (relay 217 remains energized and plate voltage is applied to thyratron 202 as long as the longitudinal motion is stopped and light shines through pinhole 58 upon photodiode 351), the firing of thyratron 202 operates relay 218 apply positive 300 volts through its contact 226 to plate of vacuum tube 228 readying the precise transverse stopping action. Contact 225 of relay 218 completes the energizing circuit for relay 272, thus removing the operating voltage for fast, forward transverse motor contactor 300 and de-energizing fast motor 13. Clutch 14a is re-energized, coupling the low speed motor 13a to drive the tools and tape 51 at low speed, until pinhole 60 moves to center line 100a. A light impulse then strikes photodiode 351a, reducing its electrical resistance and producing a pulse of current upon the grid of vacuum tube 228. Since the plate circuit is completed by the closed contact 226 of energized relay 218, plate current will flow and the switch contacts of relay 219 will close. Closed contact 229 of energized relay 219 completes the operating circuit for relay 273, its opened contacts 292 thereof, de-energize slow transverse motor contactor 290, removing the three phase supply voltage to slow transverse motor 13a. Brake 16 brings the transverse motion to a complete precise stop. Closed contact 402 of relay 273 supplies a positive 24 volt direct current through a normally closed contact in counter 337, through normally closed contacts 304 and 306 of de-energized relays 334 and 251 respectively to lead 188 and thence to an external, auxiliary contactor which causes the tool to move downward and perform its tooling operation until the lower limit switch 212 is operated. This removes the positive 24 volt supply to the external contactor and the tool moves back to its upward position, operating limit switch 277. The first and any other motion of slide 8 causes the opening of limit switch 213 preventing the operation of the longitudinal motors by keeping relays 236 and 238 from operating until after the transverse operation is completed and the limit switch 213 is again closed at the zero transverse position.

Closed contact 230 of energized relay 219 energizes relay 231 when the punch operates limit switch 212 at the lowest point of its travel. A counting circuit in counter 337 is also energized at this time to record the operation. The operation of relay 231 opens its normally closed contact 220 and removes the plate voltage of thyratron 214 thus readying the longitudinal stopping circuit for the next light impulse.

In addition to the counting action, the punch lowest travel limit switch 212 de-energizes relays 215, 218, 217 and 219, readying both the longitudinal and transverse stopping circuits.

Relays 274, 275 and 276 which control the forward and return transverse motion, cannot operate until upper limit switch 277 is again closed by the punch returning to its upper rest position for a particular abscissa distance; at this time relay 276 becomes energized completing the energizing circuit for reversing transverse motor contactor 311 and energizing clutch 14. Motor 13 operates in a reverse direction at high speed until limit switch 213 is closed at the zero rest transverse position. Relay 236 operates with contact 307 and releases relay 276 which releases reversing contactor 311 thereby removing the reversing three phase supply voltage to motor 13, and producing the stopping of the reverse transverse motion. Relay 237 and time delay relay 238 operate as before since switch 240 was left closed automatically producing another cycle of longitudinal and transverse action as already described, unless there is more than one pinhole in the longitudinal tape at the same abscissa or gauge line distance. In such case there will be no longitudinal motion but the transverse action as described above will take place again progressively to search out rapidly and then slowly and precisely stop at each next pinhole having a greater ordinate distance on the same abscissa, and the punch operation will proceed again after which the same resetting action takes place to return the tool to its up position until all pinholes existing on tape 48 at this abscissa distance have been scanned before slide 8 is returned rapidly by motor 13 to its zero transverse position. At this time after all pinhole controlled punch operations at a particular abscissa distance are completed, the longitudinal circuits are again readied and tape 48 will travel to the next pinhole at the next abscissa distance on the longitudinal tape.

Pushbutton 241 is a longitudinal stop button and when pressed will produce a complete stopping in the longitudinal motion.

When the working strokes of table 23 and slide 8 in a longitudinal and transverse direction and fabrication on workpiece 6 have been completed, the operator operates pushbutton 241 and opens switch 240 ending the forward longitudinal motion. Pushbutton 242 controls the reverse longitudinal motion by energizing relay 239 which with contact 319 energizes reverse longitudinal motor contactor 321 energizing motor 31 in a reverse direction. Clutch 30 also is energized producing the reverse longitudinal motion. Reverse longitudinal motion can be stopped manually by opening pushbutton 241, or automatically by zero longitudinal limit switch 371 being opened when the longitudinal motion has been restored to the zero rest position.

An alarm circuit may also be provided operating as follows. The longitudinal and transverse precise stopping circuits use vacuum tube amplifiers to operate the respective slow motor drive circuits. As long as a light beam is continuously received, the drive circuit will remain inoperative; but if there should occur a small longitudinal or transverse motion, the light beams will no longer shine through the pinholes and relays 217 or 219 will not remain energized. If, for example, relay 217 becomes de-energized due to a displacement in the longitudinal index stopping position, relay 235 will also become de-energized closing its contact 323. Relay 251 becomes energized through the normally open contact 325 of new energized relay 324. The normally closed contacts 250 and 286 of energized relay 251 now open the forward and return transverse and longitudinal motions (keeping the table motionless) and preventing the downward punch motion. The normally open contact 367 of energized relay 251 lights signal lamp 375 indicating an error in longitudinal positioning. The alarm system becomes de-energized after the execution of the hole and at the start of the return transverse motion.

Any motion disturbing the transverse index stopping position produces a similar alarm action. Relay 219 becomes de-energized, opening relay 273, causing contact 330 thereof to energize relay 334 through normally open contact 332 of energized relay 331. Normally closed contacts 284 and 304 of energized relay 334 open the transversal movement and downward motion of the punch, respectively, while normally open contact 376 thereof lights signal lamp 378 indicating an error in transverse positioning. This alarm circuit is made non-operative by the downward motion of punch holding neck 7 at its lowest position through the opening of limit switch 212.

An impulse counter 337 is manually set at the beginning for the proper number of operations. Every time punch 4, after executing a hole, trips limit switch 212, a pulse of current operates the counting device. At the end of the operations, if the number of holes punched correspond to the number set at the beginning, signal lamp 347 will light. If some holes have not been punched, alarm bell 379 will ring during the back-up longitudinal movement. If more than one set number of holes is attempted to be executed, the feed circuit for the clutch of the downward movement of punch 4 is opened, and when the transverse stop circuit is energized, alarm signal lamp 388 and alarm bell 387 will operate giving the warning.

In the foregoing circuit description, the photo-diodes 350 and 351 respectively correspond to a representative diode 86 in deceleration line 99 and to a representative diode 86 in index stop line 100. In the same way photo-diodes 350a and 351a correspond to representative diodes 86a in the transverse deceleration and index stop columns in registry with lines 99a and 100a. Moreover, on the circuit diagram shown in FIGURE 10, a number of the electrical parts have been provided with identifiable reference numerals including principally wire connections, e.g., 150 to 164, 166 to 182, 184 to 188 and others, shown between respective relays, switches and other parts in the diagram.

It is clear that the fabrication system of this invention may be applied to other embodiments such as an embodiment in which the tool is held stationary in a transverse direction while the workpiece support is mounted so as to provide the actual transverse motion in accordance with the teaching disclosed herein; that the number of gauge lines and crossing ordinate lines on the workpiece and the correspondingly prepared tapes may be selected virtually at will and that other positionings of the control and other parts may be made. Reference is also made to application for United States Letters Patent Serial No. 441,856 filed July 5, 1954, for "Fabrication System" now Patent No. 2,947,203.

Various other modifications may be constructed and changes made in aspects of the illustrated embodiments without departing from the spirit of our invention or the scope of the appended claims.

We claim:

1. In a fabrication system capable of performing a plurality of tooling operations by means of a single tool upon a workpiece at predetermined work locations along gauge lines thereon, apparatus comprising, in combination, a longitudinal tape member of opaque, intextensible and flexible material having minute light perforations therethrough generally in the pattern to be duplicated by said tooling operations at said work locations, the spacing between respective perforations in said longitudinal tape member in a longitudinal direction being the same as that between respective work locations in such direction, a longitudinal scanning head member to control the movement and stopping of said workpiece relative to said tool in a longitudinal direction in accordance with said perforations on said longitudinal tape member, means for mounting one of said longitudinal members so as to remain longitudinally fixed relative to said workpiece and the other of said longitudinal members so as to remain longitudinally fixed relative to said tool, a transverse tape member of opaque, inextensible and flexible material having a minute light perforation therethrough for each work location gauge line, the spacing between respective perforations in said transverse tape member in a transverse direction being the same as that between the work location gauge lines in such transverse direction, said tape members normally having a different number of said perforations respectively, a transverse scanning head member to control the movement and stopping of said tool relative to said work piece in a transverse direction at the respective actual work locations when respective perforations on said transverse tape member are in operative complementary relation to corresponding perforations on said longitudinal tape member, said scanning head member having operatively interconnected circuits, said circuits in said longitudinal scanning head member being respectively responsive to perforations on said longitudinal tape member to ready corresponding circuits in said transverse scanning head member for activation by complementary perforations in said transverse tape member, means for mounting one of said transverse members so as to remain transversely fixed relative to said tool and the other of said transverse members so as to remain transversely fixed relative to said workpiece, and means for moving said workpiece relative to said tool successively after each tooling operation at each work location until all said tooling operations are completed.

2. In a fabrication system as set forth in claim 1, higher speed drive means and lower speed drive means for each of said respective directions of relative movement between said workpiece and tool, means for simultaneous disconnection of said higher speed drive means and substitution of said lower speed drive means to decelerate said relative movement in each direction, and means for instantaneously stopping said decelerated relative movement respectively at each correlated longitudinal and transverse index position together comprising a work location, said drive means being operatively responsive to said members respectively.

3. In a fabrication system as set forth in claim 1, higher speed drive means and lower speed drive means for each of said respective longitudinal and transverse members and directions of relative movement between said workpiece and tool, spaced light responsive elements in each of said longitudinal and transverse scanning head members, said higher speed drive means being responsive to the nearer of said elements in each scanning head member for simultaneous disconnection of said higher speed drive means and substitution of said lower speed drive means to decelerate said relative movement in each respective working stroke direction, and means responsive to the farther of said elements for instantaneously stopping said decelerated relative movement in each respective longitudinal and transverse working stroke direction, each work location comprising the sum of one relative movement in a longitudinal direction and a second relative movement in a transverse direction, said longitudinal and transverse members being operatively interconnected for cessation of said one relative movement before the commencement of said second relative movement.

4. In a fabrication system capable of performing a plurality of tooling operations by means of a single tool upon a workpiece at predetermined work locations thereon at different abscissa distances from a longitudinal starting position, apparatus comprising, in combination, a longitudinal tape member having minute light passage perforations therethrough at respective abscissa distances for stopping of said workpiece relative to said tool in a longitudinal direction at each of said abscissa distances, a transverse tape member having minute light passage perforations therethrough, the spacing between respective perforations in said transverse tape member in a transverse direction being the same as that between said work locations in such direction, said transverse tape member normally having a different number of perforations than said first-named tape member, a transverse scanning head member to control the movement and stopping of said tool relative to said workpiece in a transverse direction at the respective actual work locations at each abscissa distance when perforations on said transverse tape member are in operative registry with said transverse scanning head member, said scanning head members having operatively interconnected circuits, said circuits in said longitudinal scanning head member being respectively responsive to perforations on said longitudinal tape member to ready corresponding circuits in said transverse scanning head member for activation by complementary perforations in said transverse tape member, means for mounting one of said transverse members so as to remain transversely fixed relative to said tool and the other of said transverse members so as to remain transversely fixed relative to said workpiece, means to actuate relative movement between said transverse members when said first-named means stops at said abscissa distances respectively, and means responsive to said members for returning said tool to its transverse starting position relative to said workpiece after the last tooling operation at each abscissa distance in a longitudinal direction.

5. In a fabrication system capable of performing a plurality of tooling operations by means of a single tool upon a workpiece at predetermined work locations thereon at different abscissa and ordinate distances from respective longitudinal and transverse starting positions, apparatus comprising, in combination, a longitudinal tape member having minute light passage perforations therethrough, the spacing between respective perforations in said longitudinal tape member in a longitudinal direction being the same as that between said work locations in such direction, a longitudinal scanning head member to control the movement and stopping of said workpiece relative to said tool in a longitudinal direction when perforations on said longitudinal tape member are in operative registry with said longitudinal scanning head member, means for mounting one of said longitudinal members so as to remain longitudinally fixed relative to said workpiece and the other of said longitudinal members so as to remain longitudinally fixed relative to said tool, and a transverse tape member having minute light passage perforations therethrough at respective ordinate distances for moving said tool in a transverse direction relative to said workpiece at each of said abscissa distances until each work location at each said abscissa distance is operated upon by said tool respectively, said tape members normally having a different number of perforations, said scanning head members having operatively interconnected circuits, said circuits in said longitudinal scanning head member being respectively responsive to perforations on said longitudinal tape member to ready corresponding circuits in said transverse scanning head member for activation by complementary perforations in said transverse tape member.

6. In a fabrication system capable of performing a plurality of automatic tooling operations by means of a single tool upon a workpiece at predetermined work locations along gauge lines thereon, apparatus comprising, in combination, a longitudinal tape member having minute energy ray impulse transmitting portions corresponding in number and distribution to said work locations, the spacing distance between respective portions in a longitudinal direction being proportional to that between said work locations in such a direction, a longitudinal scanning head member to control the movement and stopping of said workpiece relative to said tool in a longitudinal direction in accordance with said portions on said longitudinal tape member, one of said longitudinal members being connected so as to remain longitudinally fixed relative to said workpiece and the other of said longitudinal members being connected so as to remain longitudinally fixed relative to said tool, a transverse tape member having minute energy ray impulse transmitting portions, the spacing distance ratio between respective portions in a transverse direction being proportional to that between such gauge lines in such transverse direction, and a transverse scanning head member to control the movement and stopping of said tool relative to said workpiece in a transverse direction in accordance with the operative coincidence of correlative ones of said portions on said respective tape members, said scanning head members having operatively interconnected circuits, said circuits in said longitudinal scanning head member being respectively responsive to impulse transmitting portions on said longitudinal tape member to ready corresponding circuits in said transverse scanning head member for activation by complementary impulse transmitting portions in said transverse tape member, one of said transverse members being connected so as to remain transversely fixed relative to said tool and the other of said transverse members being connected so as to remain transversely fixed relative to said workpiece, said impulse transmitting portions on one of said tape members only generally corresponding to the pattern of said work locations.

7. A fabrication system control as set forth in claim 5, characterized in that, said tape members are each an opaque tape having light perforations along selected gaugelines, said scanning head members are each a scanning head for said tape, a casing enclosing each head having slots on opposite sides thereof through which said tape passes, a supporting frame in said casing having an opening therethrough, a light source connected to said frame to shine through said opening toward said tape, a pair of boxes connected to said frame in spaced relation along the direction of movement of said tape, said boxes having a base with a plurality of holes therethrough substantially perpendicular to said tape and its direction of movement, light sensitive elements in said holes respectively corresponding to said gaugelines to pass electric current in operative quantity through whatever element may receive light, diaphragm members positioned between said holes and said light source, said diaphragm members having openings therethrough in registry with the respective holes in said bases, said diaphragm members further having an enclosed recess for the passage of said tape across said holes between said light sensitive elements and said light source, means for adjusting the spacing between said boxes, circuit connections to elements in said boxes for each gaugeline operative respectively to decelerate and stop the movement of said tape relative to said scanning head upon the passage of light through a perforation of said tape respectively registering with an element in the nearer of said boxes and then with an element on the same level in the farther of said boxes, a main drive motor responsive to said circuit connections operatively connected through a magnetic clutch to a secondary shaft to move said tape at higher speed relative to said scanning head, an indexing motor responsive to said circuit connections operatively connected through a magnetic clutch to said secondary shaft to move said tape at lower speed relative to said scanning head, said first-named clutch being disconnected and said second-named clutch being connected when said circuit connections operate to decelerate, and a brake operative to stop said indexing motor when said circuit connections operate to stop said tape relative to said scanning head.

8. A fabrication system control as set forth in claim 6, characterized in that, at least said longitudinal tape member energy ray impulse transmitting portions are minute light perforations generally in the pattern of the projected work locations for a workpiece, said longitudinal scanning head member is a scanning head member for said tape member, a light source for said scanning head member, supports in spaced relation in said scanning head member along the direction of relative movement of said tape member, said supports having a plurality of holes substantially perpendicular to said tape member respectively corresponding to said gaugelines, a light sensitive element substantially in each of said holes, a guide for said tape across said holes between said light sensitive elements and said light source, circuit connections to respective elements in said respective supports for each gaugeline operative respectively to decelerate and stop relative movement between said members upon the passage of light through a perforation of said tape member respectively registering with an element in the nearer of said supports in said scanning head member and an element on the same level in the farther of said supports, a main drive motor responsive to said circuit connections operatively connected to one of said members to move it at relatively high speed, an indexing motor responsive to said circuit connections operatively connected to said one of said members to move it at relatively low speed, means responsive to said circuit connections to stop said indexing motor and relative movement between said members at indexed position corresponding to a work location, and means for restarting relative movement between said members at least initially utilizing said indexing motor.

9. In a fabrication system operative upon a workpiece by the movement of at least one tool in two directions respectively at an angle to one another to position said tool successively in aligned position with the location where the tooling work is to be performed on said workpiece, apparatus comprising, in combination, means for moving said workpiece relative to said tool in a first direction, means for moving said tool relative to said workpiece in a second direction, a first and second set of radiant energy tape and reader members respectively for said first and second directions, means for moving said tape and reader relatively in said first set in accordance with relative motion between said workpiece and tool in said first direction, means for moving said tape and reader relatively in said second set in accordance with relative movement between said workpiece and tool in said second direction, each of said sets having a deceleration station and a precise stopping station for the control of said relative movements between workpiece and tool in said first and second directions respectively, means responsive to the action of said first set of tape and reader members to initiate relative movement in said second direction upon the cessation of relative movement in said first direction, said respective tape members normally having different arrangements of radiant energy transmitting portions, said reader members in said sets having operatively interconnected circuits, said circuits in said reader member in said first set being respectively responsive to transmitting portions in said tape member in said first set to ready corresponding circuits in said reader member in said second set for activation by complementary transmitting portions in said tape member in said second set, and means responsive to said second set of tape and reader members for resuming said relative movement in said first direction upon cessation of relative movement in said second direction.

10. In a fabrication system as set forth in claim 9, at least said reader member in said first set having a spaced pair of station groups of separate impulse sensitive elements adjacent but selectively spaced in the direction of the relative movement of the respective tape member, each of said groups having a plurality of separate impulse sensitive elements in substantially perpendicular cross relation to said tape member, the level of said elements in said groups corresponding to imaginary lines on said workpiece for work locations respectively, said two last-mentioned means interacting automatically responsive to said first and second sets to move said workpiece relative to said tool in said first direction to bring work locations successively to a stop in indexed intersecting relation with said second direction and then to move said tool relative to said workpiece in said second direction as many times as there are work locations in such intersecting relation to complete tooling operations at said last-named work locations before resumption of relative movement in said first direction.

11. In a fabrication system as set forth in claim 10, separate fast and slow motor means operatively connected to said reader member, said tape member having minute impulse transmitting portions thereon in the pattern of said work locations, means for instantly disconnecting said fast motor means and connecting said slow motor means to said system for the relative movement of workpiece and tool as each impulse transmitting portion of said tape member registers with any element in the group thereof nearer to that portion as it approaches in the course of the relative movement of said tape member, and means for instantly stopping said slow motor means when said portion registers with the other of said groups to hold said workpiece until the completion of tooling operations at a work location in alignment with said second direction at that stopped position.

References Cited in the file of this patent

UNITED STATES PATENTS

| | | |
|---|---|---|
| 1,837,509 | Watts | Dec. 22, 1931 |
| 2,710,934 | Senn | June 14, 1955 |
| 2,758,515 | Smith | Aug. 14, 1956 |
| 2,866,506 | Hierath et al. | Dec. 30, 1958 |
| 2,947,203 | Ausenda et al. | Aug. 2, 1960 |